United States Patent [19]

Pinnavaia et al.

[11] Patent Number: 5,785,938
[45] Date of Patent: Jul. 28, 1998

[54] PROCESS USING RECYCLABLE SORBENTS FOR THE REMOVAL OF SOX FROM FLUE GASES AND OTHER GAS STREAMS

[75] Inventors: Thomas J. Pinnavaia, East Lansing; Malama Chibwe, Lansing; Jayantha Amarasekera, Southgate, all of Mich.

[73] Assignee: Board of Trustees operating Michigan State University, East Lansing, Mich.

[21] Appl. No.: 691,424

[22] Filed: Aug. 2, 1996

Related U.S. Application Data

[63] Continuation of Ser. No. 319,921, Oct. 7, 1994, abandoned, which is a continuation-in-part of Ser. No. 976,543, Nov. 16, 1992, Pat. No. 5,358,701.

[51] Int. Cl.$^6$ .................................................. B01J 8/00
[52] U.S. Cl. ........................ 423/244.01; 423/244.06; 423/244.07; 423/244.08; 423/420.2; 423/532; 502/327
[58] Field of Search ............... 423/244.01, 244.06, 423/244.07, 244.08, 420.2; 502/327

[56] References Cited

U.S. PATENT DOCUMENTS

| | | | |
|---|---|---|---|
| 3,699,037 | 10/1972 | Annouser et al. | 208/120 |
| 3,835,031 | 9/1974 | Bertolacini et al. | 208/120 |
| 4,153,534 | 5/1979 | Vasalos | 208/120 |
| 4,866,019 | 9/1989 | van Broekhoven | 502/65 |
| 4,946,581 | 8/1990 | van Broekhoven | 208/120 |
| 4,952,382 | 8/1990 | van Broekhoven | 423/244 |
| 5,079,203 | 1/1992 | Pinnavaia et al. | 502/84 |
| 5,114,691 | 5/1992 | Pinnavaia et al. | 423/244 |
| 5,114,898 | 5/1992 | Pinnavaia et al. | 502/406 |
| 5,116,587 | 5/1992 | Pinnavaia et al. | 423/244 |

FOREIGN PATENT DOCUMENTS 0278535  8/1988  European Pat. Off. .

OTHER PUBLICATIONS

Comey, "A Dictionary of Chemcial Soluibilities Inorganic" p. 504, 1928.
Komppa, V. "Dry Adsorption Processes for Removal of $SO_x$ and $NO_x$ in Flue Gases —a review," Perii Ja Puu, 5, 401 to 405 (1986).
Kocaefe et al. in Cand. J. Chem. Eng., vol. 63, 971–977 (1985), "Comparison of the Sulfation Rates of Calcium Magnesium and Zinc Oxides w/ $SO_2$ and $SO_3$".
Reichle et al. in J. Catal. 101, 352 to 359 (1986). "The Nature of the Thermal Decomposition of a Catalytically Active Anionic Clay Mineral".
Neuwmann et al., Z. Electrochem., 38, 304 to 310 (1932).

*Primary Examiner*—David A. Simmons
*Assistant Examiner*—Linda L. Gray
*Attorney, Agent, or Firm*—Ian C. McLeod

[57] ABSTRACT

A process for removing and then capturing noxious sulfur oxides from gas streams, particularly from the flue gases of coal-burning power plants, using Ni-containing heated layered double hydroxide (LDH) as recyclable sorbents. The sorbent compositions contain metal components that form stable metal sulfites and sulfates at one temperature, but are decomposed at a higher temperature to regenerate the sorbent material.

10 Claims, 1 Drawing Sheet

Graph showing SOx uptake by a sorbent derived from Ni3Al-LDH and its regeneration

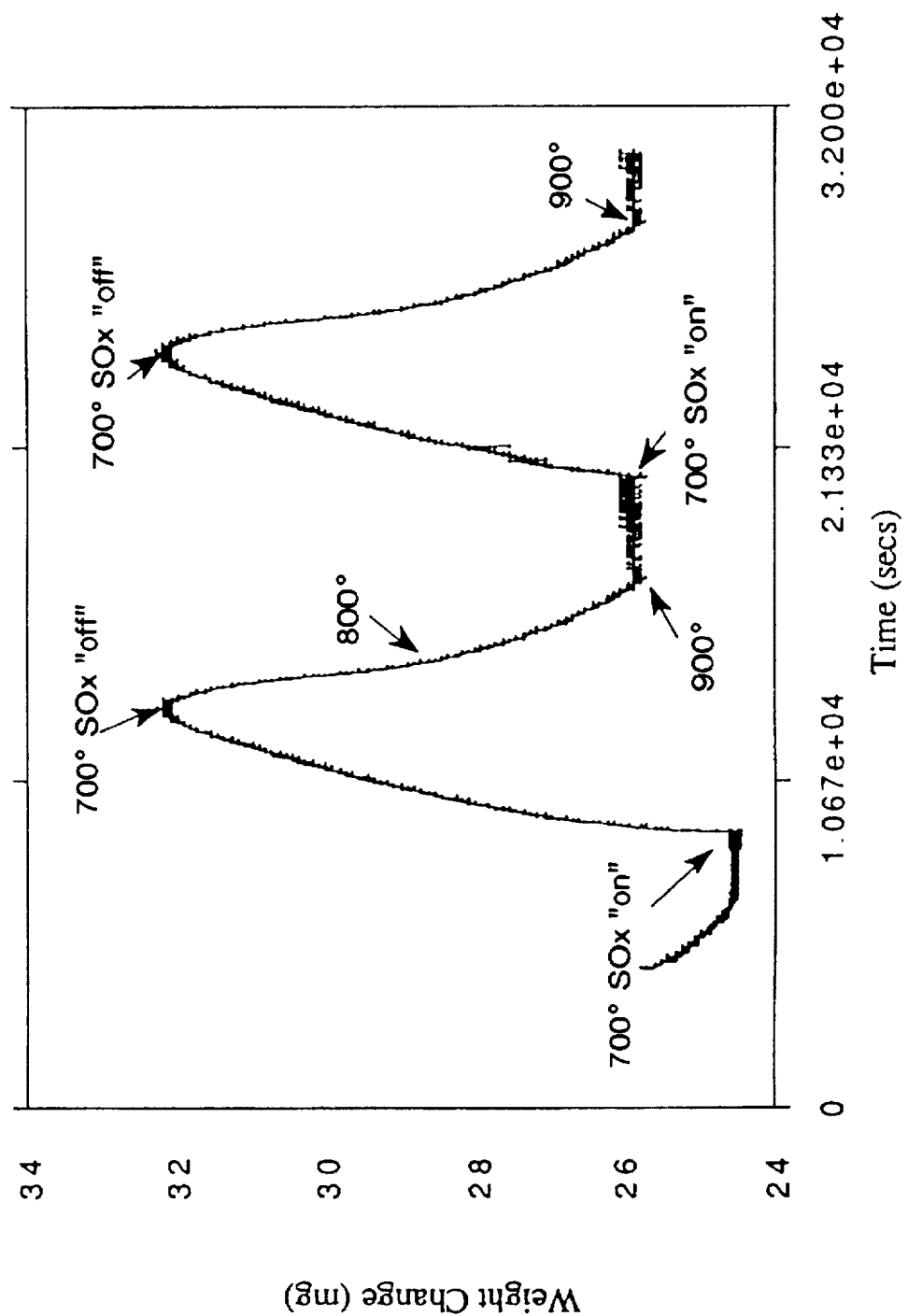

PROCESS USING RECYCLABLE SORBENTS FOR THE REMOVAL OF SOX FROM FLUE GASES AND OTHER GAS STREAMS

CROSS-REFERENCE TO RELATED APPLICATION

This application is a continuation of application Ser. No. 08/319,921, filed Oct. 7, 1994, now abandoned, which is a continuation-in-part of application Ser. No. 07/976,543, filed Nov. 16, 1992, now U.S. Pat. No. 5,358,701.

BACKGROUND OF THE INVENTION

(1) Field of Invention

The present invention relates to a process for using regenerable sorbents for the removal of sulfur dioxide and sulfur trioxide from gas mixtures. In particular, the invention relates to the use of layered double hydroxides as regenerable $SO_x$ adsorbent precursors from flue gases of coal-burning power plants.

(2) Description of Related Art

In fossil-fuel-fired power plants, the sulfur content of the feed coal is oxidized during combustion to sulfur oxides ($SO_x$ and $SO_3$, commonly referred to as "$SO_x$"), which are released through stacks to the atmosphere, and are responsible for deposition as "acid rain". Analyses of flue gas produced by power plants burning coal before desulfurization, show 0.5%–0.2% $SO_2$ and about 0.005% $SO_3$. Control of $SO_x$ emission is mandated by the U.S. Environmental Protection Agency (EPA), and various studies are under way to develop methods for its removal from flue gas streams.

Formation of $SO_x$ in combustion process can be reduced by modifying the burner design and combustion system, by changing the operating conditions and by using fuel with lower sulfur contents. The most popular and inexpensive method of reducing $SO_x$ emission is the addition of reactive dry sorbents with the fuel. Accordingly at present, $SO_x$ removal is most often accomplished by using lime (CaO) or lime stone ($CaCO_3$). Several other basic sorbents like MgO and ZnO also are found to be effective in removing $SO_x$. For a review on dry sorbents see for example Komppa, V., "Dry Adsorption Processes for Removal of $SO_x$ and $NO_x$ in Flue Gases—a review, "Perii Ja Puu, 5, 401 to 405 (1986).

Use of Group 2 (formerly Group IIA) metal oxides such as magnesium and calcium oxides as $SO_x$ sorbents has been disclosed in several patent disclosures and examples include U.S. Pat. Nos. 3,835,031 and 3,699,037. Several other metal oxides of varying effectiveness as $SO_x$ sorbents are described in U.S. Pat. No. 4,153,534 which include oxides such as sodium, scandium, titanium, iron, chromium, molybdenum, manganese, cobalt, nickel, copper, zinc, cadmium, rare earth metals, and lead.

In typical coal-fired power plants the ground sorbents, for example lime or limestone, are added to the boilers along with the coal or sprayed into towers as a slurry to contact the flue gas. The $SO_2$ reacts with the calcium oxide base to form calcium sulfite which is then partially oxidized with air to form calcium sulfate. In this way the sulfur oxides are retained as harmless solid compounds which can be removed from the stack gas by electostatic precipitation or other standard methods. Such a process is potentially attractive for retrofitting existing power plants since no major structural alterations are required.

A major problem with this type of process is low utilization of the oxide sorbents. The rate of adsorption of $SO_x$ declines rapidly with increasing conversion, due to mass transfer limitation and low reactivity of $SO_2$. Hence, in the relatively short contact time available, only a small fraction of the sorbents reacts. In principle, the problem of low utilization of the sorbents may be solved by reducing the particle size, but in practice, the particle size required for a reasonable level of utilization may be too small to achieve economically by conventional grinding or fragmentation methods.

Thermodynamic calculations indicate that the capture of sulfur trioxide with metal oxides is more favorable compared to sulfur dioxide. Several experimental results have suggested that catalytic oxidation of sulfur dioxide to sulfur trioxide can be beneficial for stack gas. Kocaefe and Karman in Cand. J. Chem. Eng., 63, 971–977 (1985) have shown that the rate of reaction of $SO_3$ with Ca Mg, and ZnO is greater than that of sulfur dioxide with the same oxides under identical conditions. Furthermore, inclusion of $Fe_2O_3$ (as a $SO_2$ oxidation catalyst) leads to more effective utilization of the lime.

Therefore, in designing improved sorbents for $SO_x$ removal, one must synthesize materials that will (i) oxidize $SO_2$ to $SO_3$, (ii) chemisorb the $SO_3$ formed, and (iii) be able to release the adsorbed $SO_x$ for regeneration or form stable materials for the safe deposition of the spent solid sorbents. The $SO_x$ emitted from these spent sorbents can be captured safely and can be utilized in sulfuric acid or sulfur production. These objectives are achieved in this invention by using a new class of sorbents derived from layered double hydroxides (LDHs).

LDHs are a group of anionic clay minerals. These have positively charged sheets of metal hydroxides, between which are located anions and some water molecules. Most commonly, LDHs are based on double hydroxides of main group metals such as Mg, and Al and transition metals such as Ni, Co, Cr, Zn, and Fe etc. These clays have a structure similar to brucite $\{(Mg(OH)_2\}$ in which the magnesium ions are octahedrally surrounded by hydroxyl groups with the resulting octahedra sharing edges to form infinite sheets. In the LDHs, some of the divalent cations in the brucite structure are isomorphously replaced by a trivalent ion such as $Al^{3+}$. The layers are then positively charged, necessitating charge balancing by insertion of anions between the layers.

One such anionic clay is hydrotalcite in which the carbonate ion is the interstitial anion, and has the idealized unit cell formula $Mg_6Al_2(OH)_{16}.CO_3.4H_2O$. The ratio of Mg/Al in hydrotalcite can vary between about 1.7 and 5 and various other divalent and trivalent ions may be substituted for Mg and Al. Thus, an entire family of LDHs can be derived from hydrotalcite. Based on their structure, such derivatives fall into the Pyroaurite-Sjogrenite group, wherein brucite-like layers carrying a net positive charge alternate with layers in which oxygen atoms of carbonate groups and water molecules are distributed on a single set of sites. In addition, the anion which is carbonate in hydrotalcite can be varied by synthetic means by a large number of simple anions such as $NO_3^-Cl^-$, $OH^-$, $SO_4^{2-}$ etc. Thus, a very large number of LDHs are possible, depending on the nature of the divalent and trivalent cations and the interlayer anion.

The synthesis of many LDHs is generally accomplished by simple coprecipitation methods. If a carbonate-containing product is desired, then the aqueous solution of magnesium and aluminum salts, i.e. nitrate, or chloride, is added to an aqueous solution of sodium-carbonate with good mixing at room temperature. The resulting amorphous precipitate is then heated for several hours at 60° to 200° C. to obtain a crystalline material. Washing and drying completes the synthesis in quantitative yield. By employing this precipitation method, replacement of all or part of $Mg^{2+}$ with other $M^{2+}$ ions such as $Ca^{2+}$, $Zn^{2+}$, $Cu^{2+}$, etc. or replacement of $Al^{3+}$ with other $M^{3+}$ ions such as $Fe^{3+}$, $Cr^{3+}$ etc., is also possible.

Another important aspect of the synthesis of these materials is the variation of the nature of the interstitial anion. The preparation of hydrotalcite-like materials with anions other than carbonate in pure form requires special procedures, because the LDH incorporates carbonate in preference to other anions.

The nature of the thermal decomposition of LDHs especially the hydrotalcite-like materials, have been studied in detail. For example, upon thermolysis, hydrotalcite $[Mg_6Al_2(OH)_{16}](CO_3) \cdot 4H_2O$ loses weight in two stages. First, it loses the four interstitial water molecules when heated to 200° C., while retaining the skeletal hydroxide and the interlayer carbonate. Additional heating from 275° C. to 450° C. results in the simultaneous loss of hydroxyl groups and carbonate as water and carbon dioxide, respectively. Reichle in J. Catal. 101, 352 to 359 (1986) has shown that this heating of hydrotalcite was accompanied by an increase in the $N_2$ BET surface area from about 120 to about 230 $m^2/g$ and a doubling of pore volume (from 0.6 to 1.0 $cm^3/g$, as determined by Hg intrusion). Further heating to higher temperatures causes lowering of surface area as well as reactivity. At 1000° C., the formation of MgO and the spinel phase, $MgAl_2O_4$, has been observed.

Thus, the thermal decomposition of LDHs leads to the formation of active metal oxides with fairly high basic character ($pK_a \leq 35$) and high surface area. These thermally treated materials should have exceptionally well-dispersed reactive metal centers, as judged from their catalytic properties. These properties have led us to synthesize and to utilize new thermally treated LDH materials as efficient sorbents for flue gas desulfurization. The results of this work have been disclosed in our U.S. Pat. Nos. 5,114,691, 5,116,587 and 5,114,898. These U.S. Patents describe the use of LDH sorbents for removing $SO_x$ components from flue gas streams. The LDHs are promoted with transition metal ions incorporated into the LDH layers as disclosed in U.S. Pat. Nos. 5,114,898 and 5,116,587 or into the gallery as anions according to U.S. Pat. No. 5,114,691. These sorbents react with $SO_x$ and form thermally stable metal sulfates. These materials are efficient $SO_x$ sorbents due largely to the formation of well-dispersed metal oxides upon calcination.

European Patent Application EP-A278 535, U.S. Pat. Nos. 4,952,382, 4,866,019 and 4,946,581 disclose a composition that include LDHs as a component for the removal of $SO_x$ during the refining of petroleum by fluidized catalytic cracking (FCC) methods. The LDH compositions are specifically tailored to be particularly compatible with the highly specialized petroleum cracking processes.

The LDH sorbents that are suitable for flue gas desulfurization described above are examples of disposable $SO_x$ sorbents. The $SO_x$ components are sorbed in the form of non-hazardous refractory sulfates such as $CaSO_4$ or $MgSO_4$ and thus they are especially suitable for safe disposal. Economically more attractive sorbent compositions; however, would be ones that can be recycled. Recyclable sorbents would allow entrapped $SO_x$ to be released from the spent sorbents and isolated under controlled conditions. The isolated $SO_x$ could then be used as a reagent for chemical processing, such as sulfuric acid manufacturing, and the fresh sorbent reused, thus eliminating the need for landfill disposal.

In our previous disclosure, U.S. Pat. No. 5,114,691, we described a $Zn_2Al$-LDH system in which the oxidation catalyst was incorporated into the gallery of the LDH structure. For example, a Zn/Al-LDH containing intercalated $SiV_3W_9O_{40}^{7-}$ polyoxometalate anions showed a 5.78% weight uptake at 700° C. in the presence of air containing 0.50% $SO_2$. In pure air at 900° C. the spent sorbent (now in sulfate form) released all of its bound $SO_x$ to return to its initial weight prior to $SO_2$ treatment and to reform the active oxide sorbent. The reformed sorbent had a $SO_x$ reactivity similar to he initial sorbent. In this latter system the vanadium functioned as the $SO_x$ oxidation catalyst, whereas the Zn and Al acted as the basic sites for the capture of the $SO_3$ formed. The major problem, however, was the high manufacturing costs of these materials. The preparation of polyoxometalate intercalated LDH materials require special methods, as described in U.S. Pat. No. 5,079,203. In this invention we disclose modified LDH compositions that absorb $SO_x$ at moderate temperatures and release the entrapped $SO_x$ at elevated temperature.

OBJECTS

It is therefore an object of the present invention to provide novel, relatively low cost, recyclable LDH sorbent compositions which oxidize $SO_2$ to $SO_3$, remove the $SO_3$ and then can be recycled by controlled release of the sulfur oxides at a higher temperature. Also described are economical and relatively simple methods of preparation of these recyclable sorbents. These and other objects will become increasingly apparent by reference to the following description.

BRIEF DESCRIPTION OF THE DRAWINGS

FIG. 1 is a graph showing the $SO_x$ uptake by a sorbent derived from $Ni_3Al$-LDH and its regeneration.

DESCRIPTION OF PREFERRED EMBODIMENTS

The present invention relates to a process for using a regenerable sorbent for removing $SO_x$ components from flue gas and other gas streams which comprises: (a) contacting the said gas streams with a heated sorbent composition at a temperature between about 400° and 900° C., wherein the sorbent has the formula:

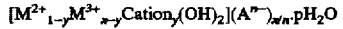
$[M^{2+}{}_{1-y}M^{3+}{}_{x+y}Cation_y(OH)_2](A^{n-})_{x/n} \cdot pH_2O$ wherein $M^{2+}$ is a divalent metal cation, $M^{3+}$ is a trivalent metal cation, the Cation is optional and selected from the group consisting of $E^{2+}$ as a divalent metal cation and $D^{3+}$ as a trivalent metal cation, A is a non-metallic interlayer anion of charge n–, x+y is between 0.15 and 0.35 and $o<y \leq (1-x)$ and p is a positive number; (b) heating the sorbent at a temperature which releases the $SO_x$ to regenerate the sorbent; and (c) capturing the $SO_x$ released from the sorbent.

The present invention relates to the synthesis and application of regenerable sorbents for removing the $SO_x$ components from flue gas and other gas streams which comprises: (a) contacting the said gas streams with a heated sorbent composition at about 400° C. to 900° C., wherein the said sorbent before being heated has a layered double hydroxide structure of formula:

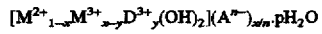
$[M^{2+}{}_{1-x}M^{3+}{}_{x-y}D^{3+}{}_y(OH)_2](A^{n-})_{x/n} \cdot pH_2O$ wherein $M^{2+}$ is a divalent metal cation, $M^{3+}$ and $D^{3+}$ are trivalent metal cations, wherein the said $M^{2+}$ is selected from the group consisting of metal cations which form metal oxides and which are capable of reacting with $SO_2$ to form metal sulfites and with $SO_3$ to form thermally stable metal sulfates at reaction temperature and release bound $SO_2$ and $SO_3$ at a higher temperature (hence constituting a recyclable sorbent), and $D^{3+}$ is incorporated into the layers of the layered double hydroxide structure as a replacement for all or part of $M^{3+}$ metal cations, and selected from the group consisting of metal cations which provide oxidation of sulfur dioxide to sulfur trioxide in an amount sufficient that said layered double hydroxide structure promotes the oxidation of the sulfur dioxide to sulfur trioxide at sulfur dioxide oxidation conditions, (b) heating the sorbent at a temperature which releases the $SO_x$ to regenerate the sorbent; and (c) capturing the $SO_x$ released from the sorbent.

The present invention also relates to a process for using a regenerable sorbent for removing the $SO_x$ components from flue gas and other gas streams which comprises: (a) contacting the said gas streams with a heated sorbent composition at a temperature between about 400° C. and 900° C. wherein the said sorbent before being heated has a layered double hydroxide structural formula:

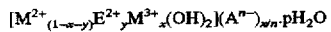

wherein $M^{2+}$ and $E^{2+}$ are divalent metal cations, $M^{3+}$ is a trivalent metal cation, A is a non-metallic interlayer anion of charge n−, x+y is between 0.15 and 0.35, and $0<y\leq(1-x)$, wherein p is a positive number, wherein said $M^{2+}$ and $M^{3+}$ are selected from the group consisting of metal cations which form metal oxides and which are capable of reacting with $SO_2$ to form metal sulfites and with $SO_3$ to form thermally stable metal sulfates at reaction temperature and release the bound $SO_2$ and $SO_3$ at a second higher temperature and regenerate the heated sorbent for reuse, and $E^{2+}$ is incorporated into the layers of the layered double hydroxide structure as a replacement for all or part of $M^{2+}$ metal cations, and selected from the group consisting of metal cations which provide oxidation of sulfur dioxide to sulfur trioxide in an amount sufficient that said layered double hydroxide structure promotes the oxidation of the sulfur dioxide to sulfur trioxide at sulfur dioxide oxidation conditions, A is an anion of charge n−, p is a positive number, x+y is between 0.35 and 0.15 and $0<y\leq(1-x)$; (b) heating the sorbent at a temperature which releases the $SO_x$ to regenerate the sorbent; and (c) capturing the $SO_x$ released from the sorbent.

The present invention thus relates to the synthesis and use of layered double hydroxide compositions for the absorption of $SO_x$ from flue gas streams. Also described herein is the incorporation of other metal components, preferably transition metal ions, capable of promoting the oxidation of sulfur dioxide to sulfur trioxide at calcination temperatures. These second metal components are incorporated into the LDH by isomorphous substitution. Another aspect of this invention is the reactivity of LDH sorbents at different temperatures, particularly in the range of 700°–900° C., with $SO_2$ such that the sorbents find particular use in diminishing the emissions of sulfur oxides from coal-fired boilers, and a method of regeneration of the spent sorbents by heating to temperatures of 900° C. or higher.

Thus, the present invention relates to the synthesis of layered double hydroxide compositions more specifically, hydrotalcite-like materials of the formula $[M_{1-x}^{2+}M_x^{3+}(OH)_2](A^{n-})_{x/n} \cdot pH_2O$ wherein $M^{2+}$ is one or more divalent metal ions and $M^{3+}$ is one or more trivalent metal ions, A is an anion of charge n−, and x is between about 0.15 and 0.35, which are suitable for the absorption of $SO_x$. Both $M^{2+}$ and/or $M^{3+}$ comprise in total or in part metals (preferably from groups 2, 12 and 13, which were formerly IIA, IIB and IIIA of the periodic table, respectively) that form reactive basic oxides at calcination temperatures (preferably above 500° C.) that are capable of reacting with $SO_x$. Accordingly, the preferred LDHs for use in the present invention comprise metals in the brucite-like [Mg(OH)$_2$-like] layers, in particular magnesium, iron and aluminum.

This invention considers the use of LDH based materials that are able to capture $SO_x$ at about 700° C. and then release the sulfur oxides at 900° C. or higher. Thus, the LDH sorbents were thermally treated in a temperature-programmed thermogravimetric balance at a temperature in the range of 700°–900° C. in a stream of air or nitrogen, and $SO_2$ gas was introduced. The amount of $SO_2$ that reacted with the sorbents was monitored by weight uptake.

The reaction of thermally activated Ni/Al LDH, $[Ni_6Al_2(OH)_{16}](CO_3) \cdot xH_2O$ (hereafter referred to as Ni$_3$Al-LDH) with $SO_2$ provided a general description of the typical experimental method used to investigate reactivity. Nl$_3$Al-LDH was heated to 700° C. under a stream of air in a temperature controlled thermogravimetric balance at a rate of 5° C./min. The sample was calcined at 700° C. for an additional one hour. During the above calcination process the sample lost weight due to the removal of $CO_2$ and $H_2O$. This sample was then exposed to $SO_2$-containing stream of air at 0.5% v/v concentration, at a flow rate of 200 ml/min for 1 hour (Step 2). The weight uptake corresponded to the amount of $SO_x$ absorbed needed to convert 34% of the nickel sites to nickel sulfate, NiSO$_4$. The diffraction peaks observed in the X-ray diffraction pattern of the final product were due to crystalline NiSO$_4$ and no crystalline peaks were seen for $Al_2(SO_4)_3$, indicating that the nickel sites were the reactive species at this temperature. After 1 hour reaction the addition of $SO_2$ to the gas stream was discontinued, and the sample weight was monitored for another 1 hour in Step 3 in order to determine the thermal stability of the product at the reaction temperature in the absence of $SO_x$. The NiSO$_4$ formed was found to be stable at 700° C. The sample was further heated to 900° C. and a weight loss corresponding to 76% regeneration of the reactive Ni sites for reabsorption of $SO_x$.

In some embodiments of this disclosure some of the $M^{2+}$ ions were substituted with cations known to catalyze the oxidation of $SO_2$ to sulfur trioxide. Recyclable Zn-containing layered double hydroxide sorbents for removing the $SO_x$ components from a gas stream have compositions before being heated conforming to the formula:

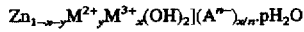

wherein $M^{2+}$ is a divalent cation and $M^{3+}$ is a trivalent metal cation, A is an interlayer anion of charge n−, x is between 0.35 and 0.15, and $0<y\leq x$. In the Zn$_2$Al-LDH some Zn$^{2+}$ sites were substituted with Ni$^{2+}$ to give Zn$_{1.6}$Ni$_{0.4}$—Al LDH. At 700° C. a weight uptake equivalent to about 9% conversion of the (Zn+Ni) over one hour was observed. Heating the spent sorbent to 900° C. in the absence of $SO_x$, resulted in the 81% regeneration of the reactive sites. Cooling the regenerated sorbent to 700 degrees Centigrade and re-exposing to a gas stream containing $SO_x$ resulted in the resorption of $SO_x$ by approximately 9% of the Zn and Ni sites.

In yet another embodiment, some of the Mg$^{2+}$ in hydrotalcite were replaced by Zn$^{2+}$. For instance, Zn$_{1.0}$Mg$_{1.0}$Al$_{1.0}$-LDH, when heated to 700° C. was found to lose weight due to dehydration, dehydroxylation and loss of the carbonate anion. On exposure to a gas stream containing 0.5% sulfur dioxide, the material gained ~4.0% by weight.

corresponding to ~3.8% conversion of the Mg and Zn sites to metal sulfates. At 900° C. an additional weight gain of ~6% was observed. A regeneration of about 12% of the reactive sites was observed upon heating at 900° C. in the absence of $SO_x$.

In another embodiment disclosed in this invention some of the Mg—Al—Fe-LDH [$Mg_6Al_{0.8}Fe_{1.2}(OH)_{16}$]($CO_3$) .$xH_2O$ was heated to 700° C. under a stream of air. When this calcined sample was exposed to $SO_2$, a weight gain corresponding to 100% conversion of MgO to $MgSO_4$ was observed. The product formed was found to be stable at 700° C. after the flow of $SO_2$ gas was discontinued. Upon increasing the temperature to 900° C., ~30% of the $MgSO_4$ was converted to $SO_x$ and regenerated Mg sites. Heating the adsorbent to 1000° C. or higher could regenerat nearly 100% of the Mg sites.

The incorporation of a third metal component into the LDH to promote the oxidation of sulfur dioxide to sulfur trioxide is important for the successful use of these materials as precursors to $SO_x$ adsorbents. The third metal component is preferably a component of a metal selected from the transition metals, rare earth metals, and Group 14 in the periodic table. Some of the known transition metal and transition metal oxide catalysts that are suitable as $SO_2$ oxidation catalysts include Pt, $WO_3$, Ag, $Ag_3VO_4$, $Cu_3(VO_4)_2$, $V_2O_5$, $Fe_2O_3$, $TiO_2$, CuO, $CrO_3$, $MnO_2$, $PbO_2$, $MoO_3$, $CeO_2$, $Cr_2O_3$, $SnO_2$ and ZnO. Platinum is an excellent oxidation catalyst, and other oxides such as vanadium pentoxide and iron oxides are also especially effective for catalyzing the oxidation of $SO_2$ to $SO_3$ (see for example, Neuwmann et al in Z. Electrochem., 38, 304 to 310 (1932)). The catalytic process on these oxides involve sorption of $SO_2$ to form a sulfite, oxidation of sulfite to sulfate, and sulfate decomposition with evolution of $SO_3$. Thus, for a particular metal oxide sorbent, the selection of a good metal oxide catalyst for $SO_2$ oxidation is very important. The requirements for a good catalyst can be compared to those for a good $SO_2$ sorbent. For the catalyst, all three steps are surface reactions and should occur at the reaction temperature. For the $SO_2$ sorbent, the first two steps should occur as bulk reactions converting much of the sorbent to sulfate during sorption at the reaction temperature. The last step should occur at a higher temperature.

More preferably, the metal catalyst component or components can be incorporated into the LDH structure by chemical means during synthesis. These metal components can be introduced into the [$M_{1-x}^{2+}M_x^{3+}(OH)_2$] layers in such a way that a part or all of the $M^{2+}$ and/or $M^{3+}$ are replaced by the sulfur dioxide oxidizing metals described earlier. Accordingly, other metal ions, such as copper, zinc, cobalt, iron, cadmium, mercury, lead, manganese, tin, nickel, palladium and mixtures thereof may replace all or part of alkaline earth metal $M^{2+}$ in LDH. Similarly, other metal ions such as iron, chromium, vanadium, manganese, gallium, boron, cobalt, and mixtures thereof may replace all or part of the $M^{3+}$ aluminum ion in hydrotalcite-like materials.

In certain embodiments described in this invention a part or all of the $Al^{3+}$ in a hydrotalcite-like material containing regenerable reactive sites is replaced by $Fe^{3+}$ in order to achieve better $SO_2$ oxidation and $SO_3$ sorption. These materials were prepared using the "precipitation method" by adding mixed metal nitrate solutions of $Zn^{2+}$, $Al^{3+}$ and $Fe^{3+}$ at desired concentrations in solutions containing NaOH and $Na_2CO_3$. It is preferred that the amount of aluminum replaced by iron be between 2 and 100%. However, replacement of more than 20% of the aluminum appeared to give amorphous products. One such amorphous composition was a Zn—Fe material which, when tested as described above, was found to rapidly adsorb $SO_x$ at 700° C. Nearly 100% of the reactive sites were regenerated when the sorbent was heated to 900° C. in the absence of $SO_x$.

The examples disclosed in this invention describe the synthesis and use of regenerable LDH sorbent compositions for the removal of $SO_x$ from gas streams, in particular, flue gas streams from coal burning power plants. In these sorbents, the incorporation of a third metal component that is responsible for the oxidation of $SO_2$ to $SO_3$ were incorporated by isomorphous replacement of some or all $M''$ or $M'''$ ions in the LDH layers. An alternative method to isomorphous substitution is the incorporation of the oxidation catalyst into the LDH sorbents by impregnation methods as disclosed in our previous invention, U.S. Pat. No. 5,116,587.

Impregnation with an oxidation catalyst may be carried out by contacting the layered double hydroxide with a solution of the metal salt, preferably an aqueous solution. The salt can be a simple water-soluble form such as a nitrate, carbonate, sulfate, chloride, acetate, formate or it may be a water soluble metal complex containing chelates such as oxalate, malonate, succinate, glutarate, maleoate, phthalate, tartarate, acetylacetonate and its derivatives, hydrazine and its derivatives and mixtures of the above. The primary criterion for choosing a complexing agent or agents is that the agent or the agents chosen provide a "water soluble" metal compound, and should not have a substantial detrimental effect on the present process or on the product layered double hydroxide composition. An LDH impregnated by a metal salt, when dried and thermally treated at reaction temperature, may contain in the final product, at least in part, the oxidation catalyst as an oxide, sulfide, halide and the like or in the elemental state.

European Patent EP-A 278 535, which was described herein earlier, disclosed hydrocarbon cracking catalyst compositions containing as a component, anionic clays with LDH structures, for the purpose of binding the $SO_x$ liberated in the refining process, especially when processing high sulfur feeds. The LDH components incorporated many of the known $SO_2$ oxidation catalysts, including rare earth metal ions (e.g., $La^{3+}$, $Ce^{3+}$), noble metals (e.g., Pt, Rh) and transition metal ions ($Cu^{2+}$, $Fe^{3+}$, $Mn^{2+}$, $Cr^{3+}$). The rare earth and noble metal catalysts were preferred over the transition metal catalysts, in part, because of their greater reactivity. Also, it is known to those skilled in the art that transition metals, particularly iron, are undesirable constituents of petroleum cracking catalysts because they promote the formation of coke. However, iron is an economically attractive $SO_2$ oxidation catalyst for applications where coke formation is not a concern, such as in the removal of $SO_x$ from the flue gases of coal-burning power plants.

Those skilled in the art will understand that the present invention describes by way of example that the effective use of layered double hydroxides (LDHs) for removal of $SO_x$ from coal-burning power plants can be made by recycling, as taught in this disclosure where by one metal cation in the LDH forms a metal sulfate that is stable at a lower temperature (for example, 700° C. or lower) but is unstable and decomposable at a higher temperature (such as 900° C.). Furthermore, an $SO_2$ oxidation catalysts can be incorporated into the structure to enhance the $SO_x$ absorptivity. In addition, we have also demonstrated the use of analogous amorphous materials containing the properties of interest, i.e., reactive $SO_x$ absorption and regeneration by thermal treatment of such materials. Additional teaching on the use of LDHs for $SO_x$ abatement have been described by Pinnavaia et al in U.S. Pat. Nos. 5,114,691 and 5,116,587.

It is known to those skilled in the art that some of the transition metals, particularly iron, are capable of oxidizing NO to $NO_2$. Thus, the transition metal-containing LDH sorbents, especially the iron-containing sorbents disclosed in this invention may be used to remove $NO_x$ components from flue gas streams and other gas streams. In such gas streams, the calcined LDHs will react with $NO_x$ components to form solid nitrates.

These sorbents may be used, for example, in the form of particles of any suitable size and shape, and such particles may be formed by conventional techniques, such as spray drying, pilling, tableting, bead formation and the like.

The following examples will serve to illustrate certain embodiments of the herein disclosed invention. These examples should not, however, be construed as the limiting scope of the novel invention as there are many variations which may be made thereon without departing from the theme of the disclosed invention.

EXAMPLE 1

The following example describes the synthesis of a $Ni_3Al$-LDH, a layered double hydroxide of formula $Ni_6Al_2(OH)_{16}.CO_3.xH_2O$, also known as the mineral takovite, when found in natural form.

The material was synthesized using the so-called precipitation method. A solution of 29.1 g (0.10 moles) $Ni(NO_3)_2$ and 12.5 g (0.033) $Al(NO_3)_3.9H_2O$ in 70 ml in deionized water was added dropwise to an aqueous solution of 12.0 g (0.30 moles) of NaOH and 10 g (0.943 moles) of $Na_2(CO_3)$ in 100 ml deionized water with gentle stirring at about 30° C. The resulting milky suspension was then crystallized at about 70° C. overnight. The product was washed by centrifugation with deionized water several times and then dried at ~120° C. The product, a greenish solid, showed an X-ray diffraction pattern profile typical of a hydrotalcite with a basal spacing of 7.69 Å.

EXAMPLE 2

This example describes the preparation of a $Zn_2Al$-LDH. To a 200 mL solution of $0.1M$ $Al(NO_3)_3.9H_2O$ was added a 1.0M solution of NaOH till the pH was 7.

The slurry was then stirred for an hour. Then a 200 mL solution of $0.3M$ $Zn(NO_3)_2.xH_2O$ was added dropwise. The pH was maintained at about 6 by adding NaOH. The product was then washed by centrifugation with deionized water several times and then dried at ~120° C. The product, an off-white (whitish) solid, an X-ray diffraction pattern profile typical of a hydrotalcite with a basal spacing of 7.7 Å.

EXAMPLE 3

$Zn_{1.6}Ni_{0.4}$-Al LDH was prepared as described in this method. The method used was as described in Example 2, except that the molar ratio of zinc nitrate and nickel nitrate was 1.6/0.4. the product obtained gave an X-ray diffraction pattern characteristic of a hydrotalcite structure with a basal spacing of ~7.8 Å.

EXAMPLE 4

The preparation of $Zn_{0.5}Mg_{0.5}$—Al LDH was accomplished as described in this method. The method used was as described in Example 2 except that the molar ratio of zinc nitrate and magnesium nitrate was 0.5/0.5. The product obtained gave an X-ray diffraction pattern typical of a hydrotalcite structure with a basal spacing of ~7.8 Å.

EXAMPLE 5

The preparation of $Zn_2Al_{1-x}Fe_x(OH)_6.CO_3.xH_2O$ is described in this example. For values of x ranging from 0 to about 2, the LDHs were prepared as described in Example 2, except that the molar ratio of zinc nitrate, aluminum nitrate and ferric nitrate was adjusted appropriately. The products obtained gave X-ray diffraction patterns corresponding to hydrotalcite structures with basal spacing of ~7.7–7.8 Å.

EXAMPLE 6

X-ray amorphous material with an LDH-like composition based on zinc, aluminum and iron was prepared as described in this example. A co-precipitated mixture of Zn/Al/Fe hydroxides in the ratio as 2:1-x:x were prepared from the corresponding nitrate salts according to the procedure described in Example 2. The x values were in the range 0.6 to 1.0. The products were then washed several times and dried at room temperature. The products prepared in this manner were largely amorphous to X-rays.

EXAMPLE 7

The preparation of hyrotalcite-like LDH sorbents with the general formula $[Mg_6Al_{2-x}Fe_x(OH)_{16}](CO_3).yH_2O$, in which some or all of the octahedral aluminum are replaced by iron, were prepared according to this example.

A solution of $Mg(NO_3)_2.6H_2O$, $Al(NO_3)_3.9H_2O$ and $Fe(NO_3)_3.9H_2O$ in 100 ml deionized water was added to a solution containing 14 ml 50% NaOH and 5 g $Na_2CO_3$ (anhydr.) in 200 ml distilled water. The addition was carried out very slowly over a period of 90 minutes with vigorous stirring. Following the addition, the resulting heavy slurry was heated at 65.±5° C. for 18 hours with good mixing. The mixture was then cooled to room temperature, and the precipitate was separated by centrifugation. The solid was washed several times with deionized water until the washings were free of salts and then dried in air. The X-ray diffraction pattern of the dried solid corresponded to hydrotalcite, and the basal spacing was found to be 7.78 Å.

EXAMPLE 8

The method used to test the reactivity of sorbents for $SO_x$ and their regenerability is described in this example. The uptake of $SO_x$ by the sorbent was determined by thermogravimetric analysis using a Cahn Model TG-121 thermogravimetric analyzer.

Approximately 40-mg portions of the sorbent was placed on a quartz pan in the thermogravimetric balance. Subsequent treatment of the sample was carried out in a four step procedure:

Step 1: Under a flow of air as a carrier gas (200 ml/min), the sample was allowed to equilibrate at 25° C. for 15 minutes and slowly heated (5° C./min) to the calcining temperature, to 700° C. The sample was maintained at this temperature for an additional 1 hour. This treatment resulted in the decomposition of the layered structure of the layered double hydroxide to give uniformly dispersed metal oxides.

Step 2: $SO_2$ gas (0.5%) was then introduced into the carrier gas at 700° C. and the weight was monitored for 1 hour period. At this stage an uptake of $SO_x$ was immediately apparent as the weight increased. The weight increase corresponded to the amount of $SO_3$ absorbed by the calcined sample.

Step 3: Passage of $SO_2$ into the carrier gas was ceased and the sample weight at reaction temperature was monitored for another 1 hour. This step was carried out in order to determine the thermal stability of the metal sulfate products formed after the reaction with $SO_x$. The implication of this is that the material does qualify for the next crucial step, i.e. regeneration of the metal oxides by decomposition in flowing air.

Step 4: The sample still under in situ conditions is then heated to 900° C. at a heating rate of about 5° C./min and the temperature kept there for an hour. This step regenerated the metal oxides for reuse in step 2 for $SO_x$ absorption.

EXAMPLE 9

$Ni_3Al$-LDH, as prepared according to Example 1, was tested for $SO_x$ uptake at 700° C. using the procedure given in Example 8. During the calcination process the sample lost weight due to the removal of $CO_2$ and $H_2O$. When exposed to $SO_2$-containing stream of air at 0.5% v/v concentration, at a flow rate of 200 ml/min for 1 hour (Step 2) a weight corresponding to the conversion of 34% of the nickel sites to nickel sulfate, $NiSO_4$ was observed. The diffraction peaks observed in the X-ray diffraction pattern of the final product were due to crystalline $NiSO_4$ and no crystalline peaks were seen for $Al_2(SO_4)_3$, indicating that the nickel sites were the reactive species at this temperature. After 1 hour reaction the flow of $SO_2$ to the gas stream was discontinued, and the sample weight was monitored for another 1 hour in Step 3 in order to determine the thermal stability of the product at the reaction temperature in the absence of $SO_x$. The $NiSO_4$ formed was found to be stable at 700° C. The sample was further heated to 900° C. and a weight loss was observed corresponding to a 76% regeneration of the reactive Ni sites. The NiO sites so regenerated could be used again for $SO_x$ adsorption.

EXAMPLE 10

$Zn_{1.6}Ni_{0.4}$—Al LDH prepared according to Example 3 was tested as described in Example 8. At 700° C. weight uptake was equivalent to 9% conversion of the Zn+Ni sites to $ZnSO_4$ and $NiSO_4$ over one hour. On heating to 900° C. a 81% regeneration of the reactive sites was observed.

EXAMPLE 11

$Zn_{1.0}Mg_{1.0}Al_{1.0}$-LDH, prepared as described in Example 4, was tested for $SO_x$ uptake as described in Example 8. When heated to 700° C., the sample was found to lose the weight expected due to dehydration, dehydroxylation and loss of the carbonate anion. Upon passing the sulfur dioxide-containing gas stream over the sorbent, a weight gain of ~4.0% was observed, corresponding to ~3.8% conversion of the Mg+Zn sites and when heated to 900° C. an additional weight gain of ~6% was observed during the heating up. A regeneration of about 12% of the reactive sites was observed at 900° C. in the absence of $SO_x$.

EXAMPLE 12

The $Mg_6Al_{0.8}Fe_{1.2}$-LDH (i.e., $[Mg_6Al_{0.8}Fe_{1.2}(OH)_{16}]$ $(CO_3).xH_2O])$ prepared as described in Example 7, was tested for $SO_x$ uptake according to Example 8. When the calcined sample was exposed to $SO_2$ a weight gain corresponded to 100% conversion of MgO to $MgSO_4$. The product formed was found to be stable at 700° C. after the flow of $SO_2$ gas was ceased. After an hour the temperature was increased to 900° C. and the material was found to lose ~30% of the $MgSO_4$, corresponding to a 30% regeneration of the reactive sites. Heating the adsorbent to a higher temperature could result in the regeneration of nearly 100% of the Mg sites. Table I compares the reactivity and regenerability of the sorbents described in Examples 9 to 13.

Table 1. Reactivity and Regenerability of Some $SO_x$ Sorbents

TABLE 1

Reactivity and Regenerability of Some $SO_x$ Sorbents

| | % $M^{2+}$ conversion[a] | % Regeneration[b] |
|---|---|---|
| $Ni_3Al$—LDH | 34 | 76 |
| $Zn_{1.6}Ni_{0.4}Al$—LDH | 9 | 81 |
| $Zn_{1.0}Mg_{1.0}Al_{1.0}$—LDH | 3.8 | 12[c] |
| $Mg_6Fe_{0.8}Al_{1.2}$—LDH | 100 | 30[c] |

[a]Conversion of $M^{II}$ sites to $MSO_4$ at 700° C. in a stream of $N_2/O_2$ (3/1 ratio) containing 5000 ppm $SO_2$ after 1 hour;
[b]Percentage of $MSO_4$ converted back to $M^{II}$ sites upon calcining to 900° C. for 1 hour in the absence of $SO_2$;
[c]The Mg based adsorbents could be completely regenerated at 1000° C.

EXAMPLE 13

The co-precipitated amorphous material prepared by co-precipitation of $Zn^{2+}$ and $Fe^{3+}$ hydroxides from nitrate salts as described in Example 6 was tested for $SO_x$ uptake as described in Example 8. A weight gain of 7 mg was observed when a 0.5% $SO_x$ was allowed to flow over the calcined sample at 700° C. in about an hour. Nearly 100% of the $SO_x$ taken up at 700° C. was lost when the product as heated at 900° C. Thus, the material was completely regenerable when heated to 900° C.

We claim:

1. A process for using a regenerable sorbent for removing $SO_x$ components from a gas stream which comprises:

(a) contacting said gas stream with a heated sorbent composition at a temperature between about 400° C. and 700° C. to remove the $SO_x$, wherein the sorbent before being heated has the formula:

    $[M_{1-x}^{2+}M_x^{3+}(OH)_2](A^{n-})_{x/n}.pH_2O$ wherein $M^{2+}$ is a divalent metal cation selected from the group consisting of nickel, zinc, magnesium and mixtures thereof, where nickel is present in the sorbent for at least part of $M^{2+}$, $M^{3+}$ is a trivalent metal cation selected from the group consisting of iron, aluminum and mixtures thereof, wherein the $M^{2+}$ and $M^{3+}$ together provide oxidation of $SO_2$ to $SO_3$ in the gas stream, A is a non-metallic interlayer anion of charge n–, x is between 0.15 and 0.35 and p is a positive number;

(b) heating the sorbent at a temperature between about 700° and 900° C. which releases the $SO_x$ to regenerate the sorbent;

(c) capturing the $SO_x$ released from the sorbent; and (d) contacting the sorbent which has been regenerated as set forth in step (b) with a second gas stream at a temperature between 400° C. and 700°C. to remove the $SO_x$ wherein the sorbent is regenerated by removal of $SO_x$ at 900°C.

2. The process of claim 1 wherein the anion A is selected from the group consisting of inorganic anions which form volatile gases at elevated temperatures.

3. The process of claim 2 wherein said anion A is selected from the group consisting of $CO_3^{2-}$, $NO_3^-$, $SO_4^{2-}$, $Cl^-$, $OH^-$, and mixtures thereof.

4. The method of claim 1 wherein $M^{2+}$ is zinc and nickel and $M^{3+}$ is aluminum.

5. The method of claim 1 wherein $M^{2+}$ is nickel and $M^{3+}$ is aluminum.

6. The method of claim 1 wherein $M^{2+}$ is nickel and wherein $M^{3+}$ is iron and aluminum.

7. The method of claim 1 wherein $M^{2+}$ is nickel and $M^{3+}$ is iron.

8. The process of claim 1 wherein the sorbent has the formula $$Ni_6Al_2(OH)_{16}.CO_3.xH_2O.$$

9. A process for using a regenerable sorbent for removing $SO_x$ components from a gas stream which comprises:

(a) contacting said gas stream with a heated sorbent composition at a temperature between about 400° C. and 700°C. to remove the $SO_x$, wherein the sorbent before being heated has the formula:

$$[Zn_{1-x-y}M_y^{2+}M_x^{3+}(OH)_2](A^{n-})_{x/n}.pH_2O$$

wherein $M^{2+}$ is a divalent metal cation selected from the group consisting of nickel, zinc, magnesium and mixtures thereof, where nickel is present in the sorbent for at least part of $M^{2+}$, $M^{3+}$ is a trivalent metal cation selected from the group consisting of iron, aluminum and mixtures thereof, wherein the $M^{2+}$ and $M^{3+}$ together provide oxidation of $SO_2$ to $SO_3$ in the gas stream, A is a non-metallic interlayer anion of charge n−, x is between 0.15 and 0.35, 0<y≦x and p is a positive number;

(b) heating the sorbent at a temperature between about 700° and 900° C. which releases the $SO_x$ to regenerate the sorbent;

(c) capturing the $SO_x$ released from the sorbent; and (d) contacting the sorbent which has been regenerated as set forth in step (b) with a second gas stream at a temperature between 400° C. and 700° C. to remove the $SO_x$ wherein the sorbent is regenerated by removal of $SO_x$ at 900° C.

10. The process of claim 1 wherein the sorbent is $[Zn_{1.6}Ni_{0.4}Al(OH)_2](A^{n-})_{x/n}.pH_2O$.

* * * * *